United States Patent
Jones et al.

(10) Patent No.: US 10,936,559 B1
(45) Date of Patent: Mar. 2, 2021

(54) STRONGLY-CONSISTENT SECONDARY INDEX FOR A DISTRIBUTED DATA SET

(71) Applicant: Amazon Technologies, Inc., Seattle, WA (US)

(72) Inventors: Shawn Jones, Vancouver (CA); Eric Samuel Stone, Seattle, WA (US); Benjamin Jeffery, Vancouver (CA); Kunal Chopra, Vancouver (CA); Mingzhe Zhu, Burnaby (CA); Alexander Kulikov, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 429 days.

(21) Appl. No.: 15/279,340

(22) Filed: Sep. 28, 2016

(51) Int. Cl.
*G06F 16/22* (2019.01)
*G06F 16/215* (2019.01)
*G06F 16/23* (2019.01)
*G06F 16/248* (2019.01)
*G06F 16/2455* (2019.01)

(52) U.S. Cl.
CPC ............ *G06F 16/215* (2019.01); *G06F 16/22* (2019.01); *G06F 16/23* (2019.01); *G06F 16/248* (2019.01); *G06F 16/24562* (2019.01)

(58) Field of Classification Search
CPC ......... G06F 17/30303; G06F 17/30345; G06F 17/30504; G06F 17/30312; G06F 17/30554
USPC ........................................................ 707/692
See application file for complete search history.

(56) References Cited

U.S. PATENT DOCUMENTS

| | | | |
|---|---|---|---|
| 5,806,075 A | 9/1998 | Jain et al. | |
| 6,058,392 A * | 5/2000 | Sampson | G06F 16/2255 |
| 6,226,650 B1 | 5/2001 | Mahajan et al. | |
| 7,356,550 B1 | 4/2008 | Lin et al. | |
| 7,490,079 B2 * | 2/2009 | Shipp | G06F 16/252 |
| 7,657,574 B2 | 2/2010 | Gupta et al. | |
| 8,554,724 B2 | 10/2013 | Zunger | |
| 8,639,786 B2 | 1/2014 | Little | |
| 9,218,383 B2 | 12/2015 | Tan et al. | |
| 9,235,609 B1 | 1/2016 | Pandey et al. | |
| 9,703,814 B1 | 7/2017 | Shams et al. | |
| 10,013,449 B1 * | 7/2018 | Xiao | G06F 16/22 |
| 10,146,814 B1 * | 12/2018 | Gupta | G06F 16/2228 |
| 2005/0033777 A1 | 2/2005 | Moraes et al. | |
| 2005/0240531 A1 | 10/2005 | Wolff | |

(Continued)

OTHER PUBLICATIONS

U.S. Appl. No. 15/625,976, filed Jun. 16, 2017, Sharatkumar Nagesh Kuppahally et al.

*Primary Examiner* — Hanh B Thai
(74) *Attorney, Agent, or Firm* — Robert C. Kowert; Kowert, Hood, Munyon, Rankin & Goetzel, P.C.

(57) ABSTRACT

A secondary index may be implemented for a distributed data set that is strongly consistent. Updates to a distributed data set that add or remove items from the distributed data set may be reflected in the secondary index as part of performing the update. Pointers to items to be added to a distributed data set may be included in the secondary index as part of processing an insertion request for the new items. Pointers to items removed from a distributed data set may be removed from the secondary index as part of processing a deletion request. Changes to the secondary index may be performed so that the secondary index does not fail to identify items that are present in the distributed data set.

20 Claims, 9 Drawing Sheets

(56) References Cited

U.S. PATENT DOCUMENTS

| | | | |
|---|---|---|---|
| 2006/0271510 A1 | 11/2006 | Harward et al. | |
| 2006/0277161 A1* | 12/2006 | Sampson | G06F 16/955 |
| 2007/0050333 A1* | 3/2007 | Vogler | G06F 16/22 |
| 2008/0065598 A1* | 3/2008 | Ritter | G06F 16/284 |
| 2008/0104149 A1* | 5/2008 | Vishniac | G06F 16/2228 |
| 2009/0323972 A1* | 12/2009 | Kohno | H04L 9/0631 |
| | | | 380/284 |
| 2010/0281005 A1* | 11/2010 | Carlin | G06F 16/22 |
| | | | 707/696 |
| 2010/0318795 A1 | 12/2010 | Haddad et al. | |
| 2012/0096046 A1 | 4/2012 | Kucera | |
| 2012/0310878 A1 | 12/2012 | Vuksan et al. | |
| 2012/0330954 A1* | 12/2012 | Sivasubramanian | H04L 67/02 |
| | | | 707/737 |
| 2013/0013606 A1* | 1/2013 | Stanfill | G06F 16/2322 |
| | | | 707/737 |
| 2014/0279855 A1* | 9/2014 | Tan | G06F 16/2228 |
| | | | 707/609 |
| 2014/0279881 A1* | 9/2014 | Tan | G06F 16/273 |
| | | | 707/613 |
| 2016/0103828 A1* | 4/2016 | Woolf | G06T 11/40 |
| | | | 707/705 |
| 2016/0188649 A1* | 6/2016 | Tan | G06F 16/273 |
| | | | 707/609 |
| 2016/0188690 A1* | 6/2016 | Tan | G06F 16/162 |
| | | | 707/613 |
| 2017/0091809 A1* | 3/2017 | Liu | H04L 67/22 |
| 2017/0193041 A1* | 7/2017 | Fuchs | G06F 16/2453 |

* cited by examiner

STRONGLY-CONSISTENT SECONDARY INDEX FOR A DISTRIBUTED DATA SET

BACKGROUND

Several leading technology organizations are investing in building technologies that sell "software-as-a-service". Such services provide access to shared storage (e.g., database systems) and/or computing resources to clients, or subscribers. Within multi-tier e-commerce systems, different resources may be allocated to subscribers and/or their applications from whole machines, to CPU, to memory, to network bandwidth, and to I/O capacity.

Database systems, implemented as a service, may manage large amounts of data on behalf of users of the service, receiving a high volume of request traffic to access data and to manage the storage of data. Different mechanisms for structuring, arranging, or otherwise making data available may be implemented in order to service such requests. Secondary indexes, for example, provide an alternative arrangement of data stored in a database system which may be accessed more efficiently for certain information requests. Data indexed in one fashion at a database may be indexed in a different fashion at a secondary index.

Figure 1:
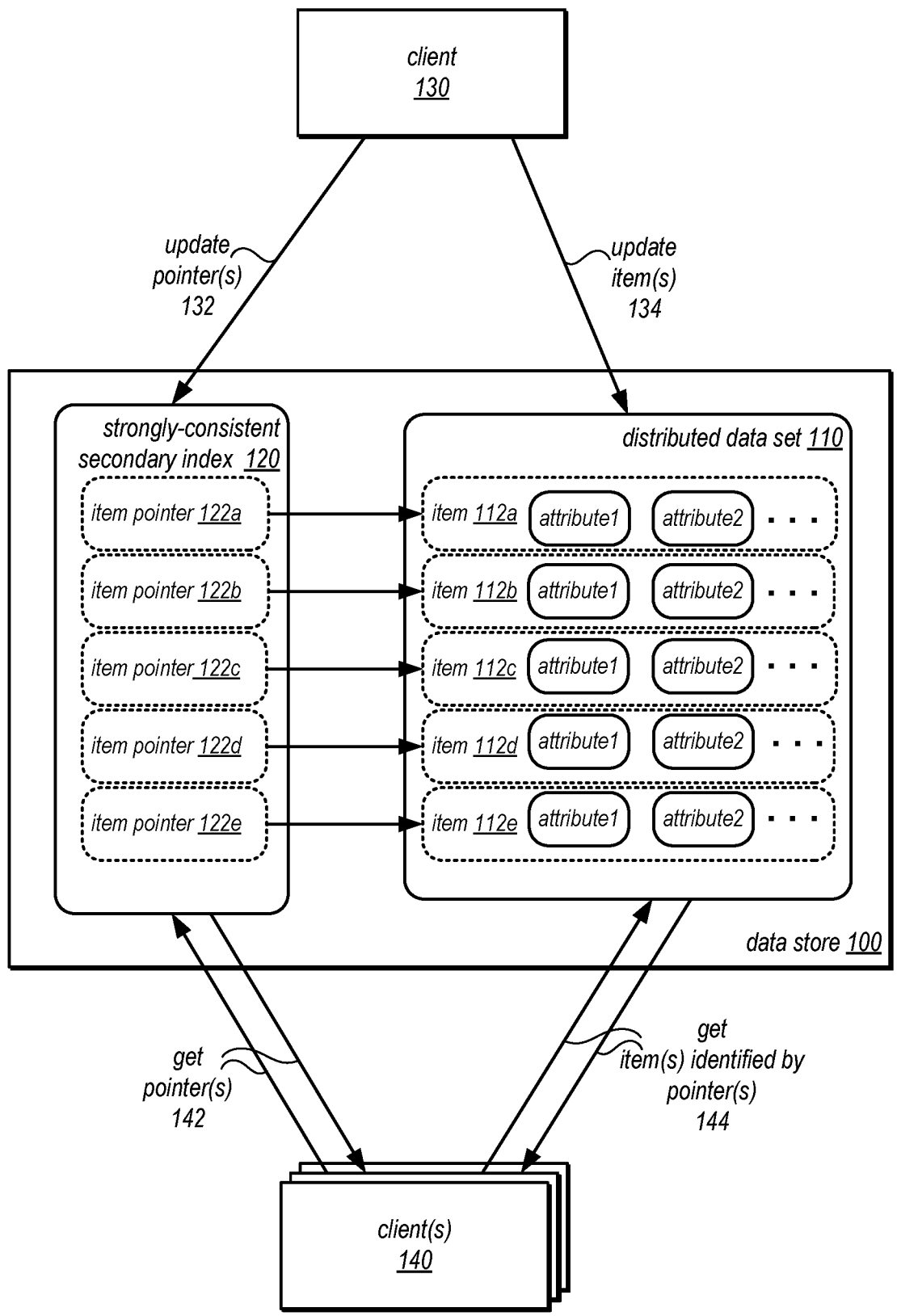
FIG. 1 is a logical block diagram illustrating a strongly consistent secondary index for servicing access requests to a distributed data set maintained in a data store, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement a strongly consistent secondary index for a distributed data set of items. Data stores offer accessible and scalable storage to one or more multiple different clients. Distributed data sets of items (which may include one or more data values or attributes stored across multiple locations, such as multiple database tables or multiple partitions of a table) may be stored, managed and accessed according to various schemes, such as a key value pair which uniquely identifies an item in a table. Generally, this allows for fast throughput to update data in items or store new items. However, in some scenarios, locating items that have particular attributes may be resource intensive. For instance, identifying items with a particular attribute value that is within a range of values would likely instigate a scan of an entire distributed data set (e.g., scanning one or multiple tables) even though the range of may be only a small portion of possible values for the particular attribute or the particular attribute may not exist for some items in the distributed data set.

Secondary indexes may be created for a distributed data set in a data store in order to provide an alternative access schema for items in addition to the schema implemented by the data store. For instance, a distributed data set may be a table that includes items for registered users and may include a user identifier, which is unique and primary key for the item, along with a first name attribute, last name attribute, gender attribute, and age attribute. A secondary index may be generated for the table which can index items according to other values than the key value pair, such as gender and age. For example, the secondary index may be generated so that all items with male attribute values are stored together according to age attribute value order. Similarly, all items with female attribute values are stored together according to age attribute value order. In this way, an access request for data that specifies a particular range of ages for males or females may be quickly obtained without performing a scan of the entire table of items, as noted above. Other attribute values may also be included in the secondary index, such as first and last name attribute values. In various embodiments, the secondary index may include a pointer to those items in the distributed data set, such as the key value pair that uniquely identifies the item.

Once created, a secondary index can be maintained to reflect changes made to the distributed data set. Changes can be reflected in the secondary index to be eventually consistent, guaranteeing that changes committed to the distributed data set will eventually be reflected in the secondary index, or strongly-consistent, guaranteeing that changes to the distributed data set will be consistent with the secondary index once the changes are committed to the secondary index. While both types of secondary indexes may provide for optimized query processing according to the different scheme used to generate the secondary index, in scenarios where a reader of the distributed data set relies upon the secondary index to be consistent with the current state of the database, an eventually consistent secondary index may provide false positives (e.g., identify items that are no longer in the distributed data set) and false negatives (e.g., fail to identify items that are in the distributed data set) when accessed to process a query directed to the database. In the event that a false negative is provided, actions taken based on the retrieved information that do not include the items that are present in the distributed data set may result in erroneous or incomplete actions. For example, a control system that maintains state information in the distributed data set may utilize a secondary index to lookup various resources that are linked together (e.g., to a common user identifier) in order to perform an action for all of the linked resources. If a newly added resource is missed, because the secondary index is not consistent the current state of the distributed data set, then the control system may not perform a desired action with respect to the missing resource. If, however, a strongly consistent index were maintained for the resources, no resources would be missed. Note that false positives, identifying items no longer in the distributed data set may correctable for eventually consistent indexes (or strongly consistent indexes), as an attempt to access the item identified by the secondary index would return an error or fail to complete.

Strongly consistent secondary indexes, however, are difficult to maintain for distributed data sets, as the strongly consistent secondary index would have to be consistent with all of the distributed data set, and not just one location. However, a client maintaining a secondary index according to the techniques discussed below can maintain a secondary index generated from multiple different locations of the distributed set in strongly consistent fashion. FIG. 1 is a logical block diagram illustrating a strongly consistent secondary index for servicing access requests to a distributed data set maintained in a data store, according to some embodiments. Data store 100 may be one of a variety of different database systems, file systems, object-based or key-value stores, that may offer users a different features for updating and accessing data. A distributed data set, such as distributed data set 110, may be maintained in data store 100 and may have a number of items 112 that include different attributes. As attributes may be unique to an item or unrelated to other items, the number of attributes in an item may differ. Moreover, in some embodiments, data store 100 may be implemented as a non-relational or NoSQL data store so that there is no imposed schema on attributes (excepting primary key attributes which may uniquely identify an item 112), attributes with a same attribute name may have different configurations (e.g., different date types, such as number or string).

A strongly-consistent, secondary index 120 may be created when distributed data set 110 is created, or later after distributed data set 110 already exists. Secondary indexes may be created according to a different indexing schema upon attribute(s) of items 112 than an indexing schema of distributed data set 110 (although indexing schemas for different secondary indexes may be very similar). For instance, distributed data set 110 may include attribute 1 (which is common to all items 112) as the attribute for indexing distributed data set 110, whereas attribute 2 may be used to generate index secondary index 120. Note that not all items may include the same number of attributes, as some data stores, such as a non-relational data store, may allow for a table to store differing numbers of types of attributes. Strongly consistent secondary index 120 may include item pointers 122 that point to an item 112 in distributed data set 110. For example, item pointer 122*a* may point to item 112*a* by including a key-value pair that identifies item 112*a*. Similarly, item pointer 122*b* may point to item 112*b*, and so on.

Strongly consistent secondary index 120 may be maintained so that the pointers 122 in secondary index 120 do not report false negatives when evaluated to process a query. For example, if an item, such as item 112*e* currently exists in distributed data set 110, then secondary index 120 is guaranteed to include a pointer, item pointer 122*e* to item 112*e*. Note that in some embodiments, strongly consistent secondary index may report false positives when evaluated to service a query. If, for instance, item 112*d* were to be deleted from distributed data set 110, strongly-consistent index 120 may still include item pointer 122*d*. However, because an attempt would be made to accessed item 112*d* based on the pointer 122*d*, the false positive would be discovered, and thus accounted for when servicing a query.

Clients of data store 100 may maintain and access strongly-consistent secondary index 120 and distributed data set 110. For example, as discussed below with regard to FIG. 2, a client-side request handler, library, or other component may be implement to maintain a secondary index and process queries by accessing the secondary index. Client 130, for example, may be implemented on a computing system, such as computing system 1000 in FIG. 9 that is authorized to access distributed data set 110 in data store 100. When client 130 makes changes to the items in distributed data set 110 (e.g., changes to add or remove items), then client 130 may update the pointer(s) 132 and the item(s) 134 as part of executing the change to the distributed data set 110. For example, updates to the pointers may be made so that a false negative is not reported (e.g., by including pointers to new items in secondary index 120 before including the new item in distributed data set 110). In this way, client 130 may maintain secondary index 120 when performing updates to distributed data set 110 so that separate update replication techniques (which result in an eventually consistent secondary index) are not needed.

Strongly-consistent secondary index 120 and distributed data set 110 may also be available to other client(s), such as client(s) 140, while updates to distributed data set 110 are ongoing. For example, client(s) 140 may request pointer(s) 142 for items that satisfy a query predicate for a query directed to distributed data set 110. The obtained pointers may then be used to get item(s) identified by the pointer(s) 144. Because secondary index 120 is strongly consistent, the retrieved pointer(s) may be consistent with the current state of distributed data set 110 at the time the request for the pointers is received (or the current state of distributed data set 110 may be derivable from the pointer(s) 142 as false positives may be discovered and accounted for). Thus, client(s) 140, may process queries with respect to distributed data set 110, before, during, and after updates to the distributed data set and still receive access to a distributed data set 110 utilizing secondary index 120 in way that is consistent with the state of distributed data set 110 at the time the query was received.

Please note that previous descriptions are not intended to be limiting, but are merely provided as logical examples of a data store, distributed data set, secondary index, and clients. Different numbers of items, attributes, components, or requests may be implemented.

This specification begins with a general description of storage service implementing a network-based data store and clients that may provide a strongly-consistent secondary index for a distributed data set stored in the network-based data store. Then various examples of the storage service are discussed, including different components/modules, or arrangements of components/module, that may be employed as part of implementing the storage service and the client. A number of different methods and techniques to implement a strongly-consistent secondary index for a distributed data set are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
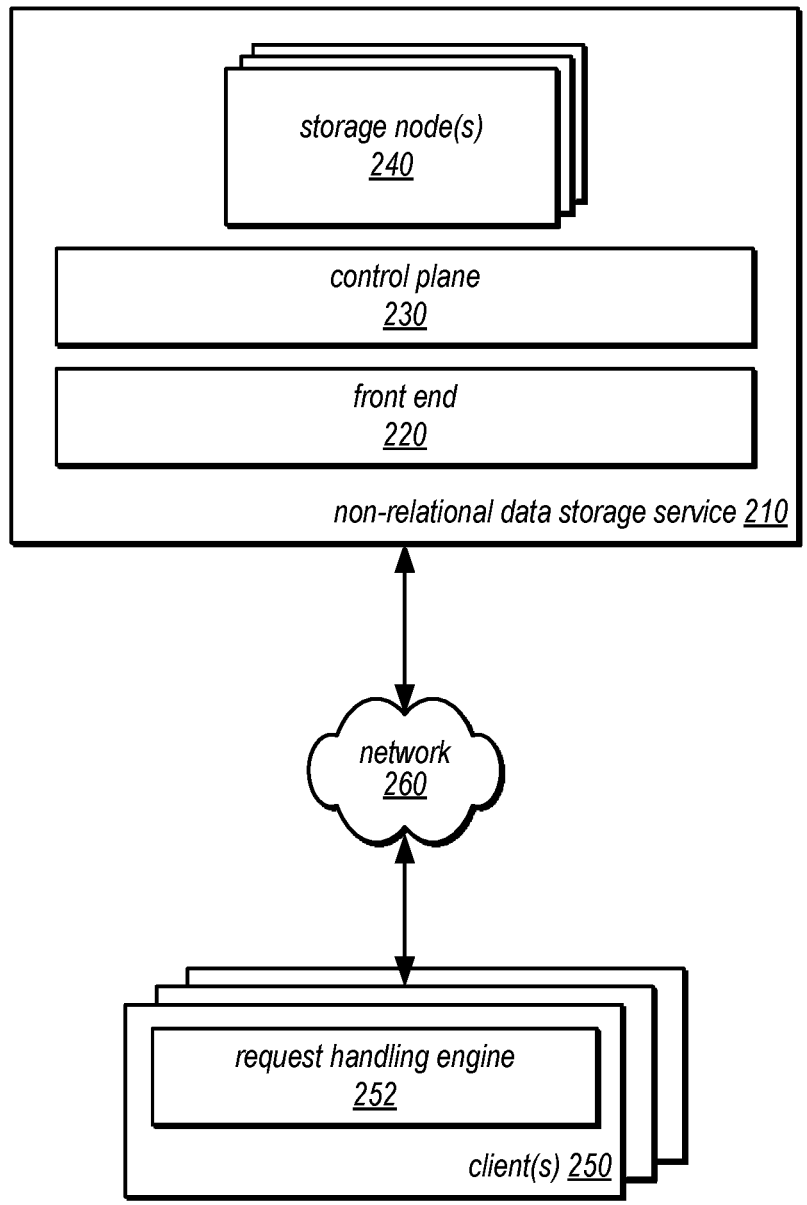
FIG. 2 is a block diagram illustrating a non-relational data storage service and clients that implement a request handling engine that maintains a strongly consistent secondary index for servicing access requests to a distributed data set maintained in the non-relational data storage service, according to some embodiments.

FIG. 2 is a block diagram illustrating a non-relational data storage service and clients that implement a request handling engine that maintains a strongly consistent secondary index for servicing access requests to a distributed data set maintained in the non-relational data storage service, according to some embodiments. It is noted that where one or more instances of a given component may exist, reference to that component herein below may be made in either the singular or the plural. However, usage of either form is not intended to preclude the other. In various embodiments, the components illustrated in FIGS. 2-5 may be implemented directly within computer hardware, as instructions directly or indirectly executable by computer hardware (e.g., a microprocessor or computer system), or using a combination of these techniques. For example, the components of FIG. 2 may be implemented by a distributed system including a number of computing nodes (or simply, nodes), such as computing system 1000 in FIG. 9 described below. In various embodiments, the functionality of a given storage service system component may be implemented by a particular computing node or may be distributed across several computing nodes. In some embodiments, a given computing node may implement the functionality of more than one storage service system component.

Generally speaking, clients 250 may encompass any type of client configurable to submit web services requests to network-based storage service 210 via network 260. For example, a given client 250 may include a suitable version of a web browser, or a plug-in module or other type of code module configured to execute as an extension to or within an execution environment provided by a web browser to provide database or data storage service clients (e.g., client applications, users, and/or subscribers) access to the services provided by non-relational data storage service 210. Alternatively, a client 250 may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing web services requests without necessarily implementing full browser support for all types of web-based data. That is, client 250 may be an application configured to interact directly with non-relational data storage service 210. In various embodiments, client 250 may be configured to generate web services requests according to a Representational State Transfer (REST)-style web services architecture, a document- or message-based web services architecture, or another suitable web services architecture.

In some embodiments, client 250 may be configured to provide access to non-relational data storage service 210 to other applications in a manner that is transparent to those applications. For example, client 250 may implement request handling engine 252 which may be a library, plug in or other component be configured to provide storage request handling capabilities including requests that generate updates to a secondary index according to the various techniques discussed below with regard to FIGS. 3-8 leveraging the capabilities offered by non-relational data storage service 210. Storage service clients 250 may convey web services requests to and receive responses from non-relational data storage service 210 via network 260. In various embodiments, network 260 may encompass any suitable combination of networking hardware and protocols necessary to establish web-based communications between clients 250 and non-relational data storage service 210. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and non-relational data storage service 210 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and non-relational data storage service 210. It is noted that in some embodiments, storage service clients 250 may communicate with non-relational data storage service 210 using a private network rather than the public Internet. For example, clients 250 may be provisioned within the same enterprise as the data storage service (and/or the underlying system) described herein. In such a case, clients 250 may communicate with non-relational data storage service 210 entirely through a private network 260 (e.g., a LAN or WAN that may use Internet-based communication protocols but which is not publicly accessible).

Generally speaking, non-relational data storage service 210 may be configured to implement one or more service endpoints configured to receive and process web services requests, such as requests to access tables maintained on behalf of clients/users by a database service or a data storage service, and/or the items and attributes stored in those tables. For example, non-relational data storage service 210 may include hardware and/or software configured to implement various service endpoints and to properly receive and process HTTP-based web services requests directed to those endpoints. In one embodiment, non-relational data storage service 210 may be implemented as a distributed system configured to receive web services requests from clients 210 and to forward them to various components that collectively implement a data storage system for processing. In other embodiments, non-relational data storage service 210 may be configured as a number of distinct systems (e.g., in a cluster topology) implementing load balancing and other request management features configured to dynamically manage large-scale web services request processing loads.

Non-relational data storage service 210 may include front end 220 (which may be configured to receive, authenticate, parse, throttle and/or dispatch service requests, among other things) and control plane 230 (which may be configured to provide a variety of visibility and/or control functions, as described in more detail herein). Non-relational data storage service 210 may also implement a plurality of storage node(s) 240, each of which may maintain and manage one or more tables on behalf of clients/users or on behalf of the data storage service (and its underlying system) itself. Some of the functionality provided by each of these types of components is described in more detail herein, according to various embodiments. Note that in some embodiments, non-relational data storage service 210 may include different versions of some of the components illustrated in FIG. 2 to provide functionality for creating, accessing, and/or managing tables maintained in database instances within a single-tenant environment than those that provide functionality for creating, accessing, and/or managing tables maintained in database instances within a multi-tenant environment. In other embodiments, functionality to support both multi-tenant and single-tenant environments may be included in any or all of the components illustrated in FIG. 2. Note also that in various embodiments, one or more database instances may be implemented on each of the storage nodes 240, and each may store tables on behalf of clients. Some of these database instances may operate as if they were in a multi-tenant environment, and others may operate as if they were in a single-tenant environment. In some embodiments, database instances that operate as in a multi-tenant environment may be implemented on different computing nodes (or on different virtual machines executing on a single computing node) than database instances that operate as in a single-tenant environment.

In various embodiments, non-relational data storage service 210 may be configured to support different types of web services requests. For example, in some embodiments, non-relational data storage service 210 may be configured to implement a particular web services application programming interface (API) that supports a variety of operations on tables (or other data objects) that are maintained and managed on behalf of clients/users by the data storage service system (and/or data stored in those tables). Examples of the operations supported by such an API are described in more detail herein.

In addition to functioning as an addressable endpoint for clients' web services requests, in some embodiments non-relational data storage service 210 may implement various client management features. For example, non-relational data storage service 210 may coordinate the metering and accounting of client usage of web services, including storage resources, such as by tracking the identities of requesting clients 250, the number and/or frequency of client requests, the size of tables and/or items stored or retrieved on behalf of clients 250, overall storage bandwidth used by clients 250, class of storage requested by clients 250, and/or any other measurable client usage parameter. Non-relational data storage service 230 may also implement financial accounting and billing systems, or may maintain a database of usage data that may be queried and processed by external systems for reporting and billing of client usage activity. In some embodiments, non-relational data storage service 210 may include a lock manager and/or a bootstrap configuration (not shown).

In various embodiments, the data storage service described herein may provide an application programming interface (API) that includes support for some or all of the following operations on the data in a table maintained by the service on behalf of a storage service client: put (or store) an item, get (or retrieve) one or more items having a specified primary key, delete an item, update the attributes in a single item, query for items using an index, scan (e.g., list items) over the whole table, optionally filtering the items returned, and create one or more secondary indexes global to the whole table which may be used to perform different queries efficiently over particular attributes in the table that are used to create the secondary index. The amount of work required to satisfy service requests that specify these operations may vary depending on the particular operation specified and/or the amount of data that is accessed and/or transferred between the storage system and the client in order to satisfy the request.

In some embodiments, the service (and/or the underlying system that implements the service) may support a strong consistency model, in addition to supporting eventually consistent read operations. In some embodiments, service requests made via the API may include an indication of one or more user preferences, such as a preferred consistency model, a preferred service request throughput level, or a service request throughput level for which a guarantee is requested. In other embodiments, some or all of these user preferences may be specified when a table is created, or may be client-specific, account-specific, specific to various table types, or specified by system-wide default values, rather than being specified on a per-request basis. The API may support extreme scaling and/or more predictable performance than that provided by prior data storage systems and services.

In some embodiments, non-relational data storage service 210 described herein may support seamless scaling of user tables in a "fully shared nothing" type architecture. For example, in some embodiments, each database partition may be implemented as a completely independent parallel computation unit. In such embodiments, the system may not provide distributed coordination across partitions or support batch "put" operations and/or multi-statement transactions. In some embodiments, as long as the workload distribution is well spread across partitions, an increase in the number of partitions may result in a larger usable table size and/or increased throughput capacity for service requests. As described herein, in some embodiments, live repartitioning (whether programmatic/automatic or explicitly initiated) may be employed to adapt to workload changes. In other words, in some embodiments, repartitioning (including partition moving, partition splitting, and/or other partition management operations) may be performed while service requests directed to the affected partitions continue to be received and processed (i.e. without taking the source partition off-line).

Front end 220 may perform parsing and/or throttling of service requests, authentication and/or metering of service requests, dispatching service requests, and/or maintaining a partition map cache. Additionally, front end 220 may include components that are common to multiple types of computing nodes that collectively implement Web services platform, such as a message bus and/or a dynamic configuration module.

Control plane 230 may provide visibility and control to system administrators, or to perform heat balancing, and/or anomaly control, and resource allocation. Control plane 230 may also include an admin console, through which system administrators may interact with the data storage service (and/or the underlying system). In some embodiments, admin console may be the primary point of visibility and control for the data storage service (e.g., for configuration or reconfiguration by system administrators). For example, an admin console may be implemented as a relatively thin client that provides display and control functionally to system administrators and/or other privileged users, and through which system status indicators, metadata, and/or operating parameters may be observed and/or updated.

As noted above, different storage nodes 240 may be implementing or maintaining resources in multiple different arrangements, some of which may be part of larger collections or groups of resources. A replica group, for example, may be composed of a number of storage nodes maintaining a replica of particular portion of data (e.g., a partition of a table) for the storage service. Moreover, different replica groups may utilize overlapping nodes, where a storage node may be a member of multiple replica groups, maintaining replicas for each of those groups whose other storage node members differ from the other replica groups. Thus if, for example replica group 1 has storage nodes A, B, and C, replica group 2 may have storage nodes B, D, and E. Besides differing groups of storage nodes, in various embodiments, storage nodes may have different relationships to other storage nodes. Continuing with the above example, for replica group 1, storage node A may be a master node, performing special functions with regard to access requests directed toward the partition maintained by replica group 1. For replica group 2, however, storage node B may be the master node. Therefore, a storage node's relationship to other storage nodes may be different depending on the particular grouping evaluated. These various examples of different arrangements of resources among storage nodes highlight the various different ways that control plane operations may interact with resources that are not solely devoted to one particular (though they may be) function, data replica, etc.

Storage nodes 240 may include a storage engine, which may be configured to maintain (i.e. to store and manage) one or more tables (and associated table data) in storage (which in some embodiments may be a non-relational database) on behalf of one or more clients/users.

The systems underlying the data storage service described herein may store data on behalf of storage service clients (e.g., client applications, users, and/or subscribers) in tables containing items that have one or more attributes. In some embodiments, the data storage service may present clients/users with a data model in which each table maintained on behalf of a client/user contains one or more items, and each item includes a collection of attributes. The attributes of an item may be a collection of name-value pairs, in any order. In some embodiments, each attribute in an item may have a name, a type, and a value. Some attributes may be single valued, such that the attribute name is mapped to a single value, while others may be multi-value, such that the attribute name is mapped to two or more values. In some embodiments, the name of an attribute may always be a string, but its value may be a string, number, string set, or number set. The following are all examples of attributes: "ImageID"=1, "Title"="flower", "Tags"={"flower", "jasmine", "white"}, "Ratings"={3, 4, 2}. The items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, unlike in traditional databases, the tables maintained by the data storage service (and the underlying storage system) may have no pre-defined schema other than their reliance on the primary key. Note that in some embodiments, if an attribute is included in an item, its value cannot be null or empty (e.g., attribute names and values cannot be empty strings), and, and within a single item, the names of its attributes may be unique. However, in at least some other embodiments, traditional database schemes may be employed, such as the various types of relational databases implemented using Server Query Language (SQL).

The database and data storage services described herein (and/or the underlying system) may provide an application programming interface (API) for requesting various operations targeting tables, items, and/or attributes maintained on behalf of storage service clients. In some embodiments, the service (and/or the underlying system) may provide both control plane APIs and data plane APIs. The control plane APIs provided by the data storage service (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables, import tables, export tables, delete tables, explore tables (e.g., to generate various performance reports or skew reports), modify table configurations or operating parameter for tables (e.g., by modifying the amount of throughput capacity, adding storage capacity for additional read replicas, splitting partitions or moving partitions), and/or describe tables. In some embodiments, control plane APIs that perform updates to table-level entries may invoke asynchronous workflows to perform a requested operation. Methods that request "description" information (e.g., via a describeTables API) may simply return the current known state of the tables maintained by the service on behalf of a client/user. The data plane APIs provided by the data storage service (and/or the underlying system) may be used to perform item-level operations, such as storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

As noted above, the control plane APIs supported by the service may include APIs that perform updates on tables (e.g., a CreateTable API and/or a DeleteTable API). In various embodiments, these APIs may invoke asynchronous workflows to perform the requested operation. In addition, the service may support methods that return the current known state (e.g., a DescribeTables API) or that return various skew metrics or reports (e.g., an ExploreTable API). In some embodiments, a common use model may be for a client to request an action (e.g., using a CreateTable API), and then to poll on its completion via the corresponding description API (e.g., DescribeTables). Other supported methods may be used to modify table configurations or parameters, e.g., an UpdateTable API (which may be used to increase the provisioned throughput capacity for a given table), a PurchaseTableCapacity API (which may be used to increase the provisioned storage capacity for a given table), a SplitTable API (which may be used to explicitly invoke an operation to split a table or any of its partitions), or a MoveTable API (which may be used to explicitly invoke an operation to move one or more tables, partitions of a table, or partition replicas of a table).

In some embodiments in which the system provides database or data storage services to clients, the system may provide an application programming interface (API) that includes support for some or all of the following operations on data maintained in a table by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned. For example, the data storage service (and/or underlying system) described herein may provide various data plane APIs for performing item-level operations, such as a PutItem API, a GetItem (or GetItems) API, a DeleteItem API, and/or an UpdateItem API, as well as one or more index-based seek/traversal operations across multiple items in a table, such as a Query API and/or a Scan API.

Multiple tables may store various items of a distributed data set. For example, a set of different database tables may store different items representing different types of computing resources, policies, users, or other computing system components that may be linked to a single account identifier. This distributed data set of items linked to the single account identifier may be added to, removed from, updated, or query according to the various techniques discussed below with regard to FIGS. 3-5.

Figure 3:
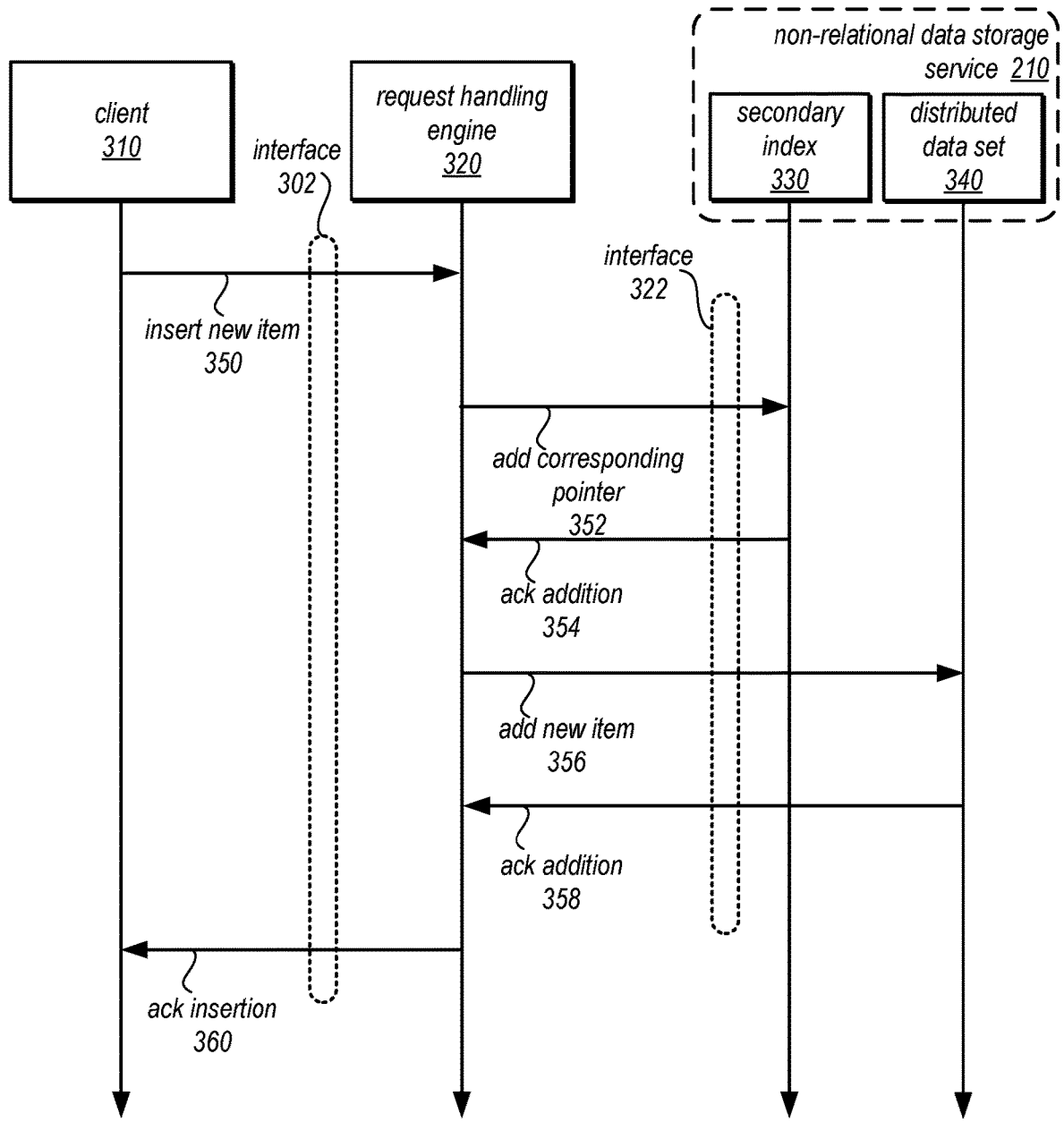
FIG. 3 is an example sequence diagram for inserting new items into the distributed data set, according to some embodiments.

FIG. 3 is an example sequence diagram for inserting new items into the distributed data set, according to some embodiments. Client 310 may interact with request handling engine 320 via interface 302. Interface 302 may be a programmatic interface, such as an Application Programming Interface (API) which may specify the format of requests like an insertion 350, deletion 450 in FIG. 4, or query 550 in FIG. 5. Client 310 may submit a request to insert a new item or items 350 that an item and attribute(s) to insert into distributed data set 340 (e.g., into a table in data asset 340) in non-relational data storage service 210.

In response to receiving the request, request handling engine 320 may send a request via interface 322 (which may be a network-based and/or programmatic interface for non-relational data storage service 210) to add a pointer 352 to secondary index 330 that points to the new item. For example, the request may include a primary key or other unique value that identifies the new item, a table identifier, storage path, location or other identifier that may be used to discover the new item within distributed data set 340. In some embodiments, additional information may be stored along with the pointer. For example, if secondary index 330 is indexed to as to organize items in the secondary index according to account identifier, then the items in secondary index 330 then the account identifier may also be included (e.g., even if the account identifier is not identifier for the item pointed to in distributed data set 340). In some embodiments, a timestamp for the time at which the pointer was created may also be stored along with the pointer.

Request handling engine 320 may receive an acknowledgement 352 of the request indicating that the pointer was successfully added. If the request failed, a failure indication may be returned (not illustrated). Although secondary index 330 now indicates that the new item is in distributed data set 340, a reader of secondary index 330 would still be able to discover that the pointer did not point to item in distributed data set 340 if the reader were to read distributed data set 340 before request addition request 356, providing a false positive result to a reader. However, this false positive may be discovered by the reader when attempting to get the new item identified by the pointer, so a consistent view of distributed data set 340 that is current as of the time the read request was received may still be determined.

Upon receiving the acknowledgment of the pointer addition 354, request handling engine may then send a request to add the new item 356 to distributed data set 340 via interface 322. The new item may include various attributes or other data according to the storage schema underlying distributed data set 340 (or as in the case of the non-relational data storage service 210, no storage schema excepting including a primary key that uniquely identifies the item). If the request to store the new item is successful, non-relational data storage service 210 may send an acknowledgement of the request to add the new item to request handling engine 320. If the addition were unsuccessful, a failure indication would be returned (not illustrated). In turn request handling engine 320 may then acknowledge the insertion 360 to client 310.

Figure 4:
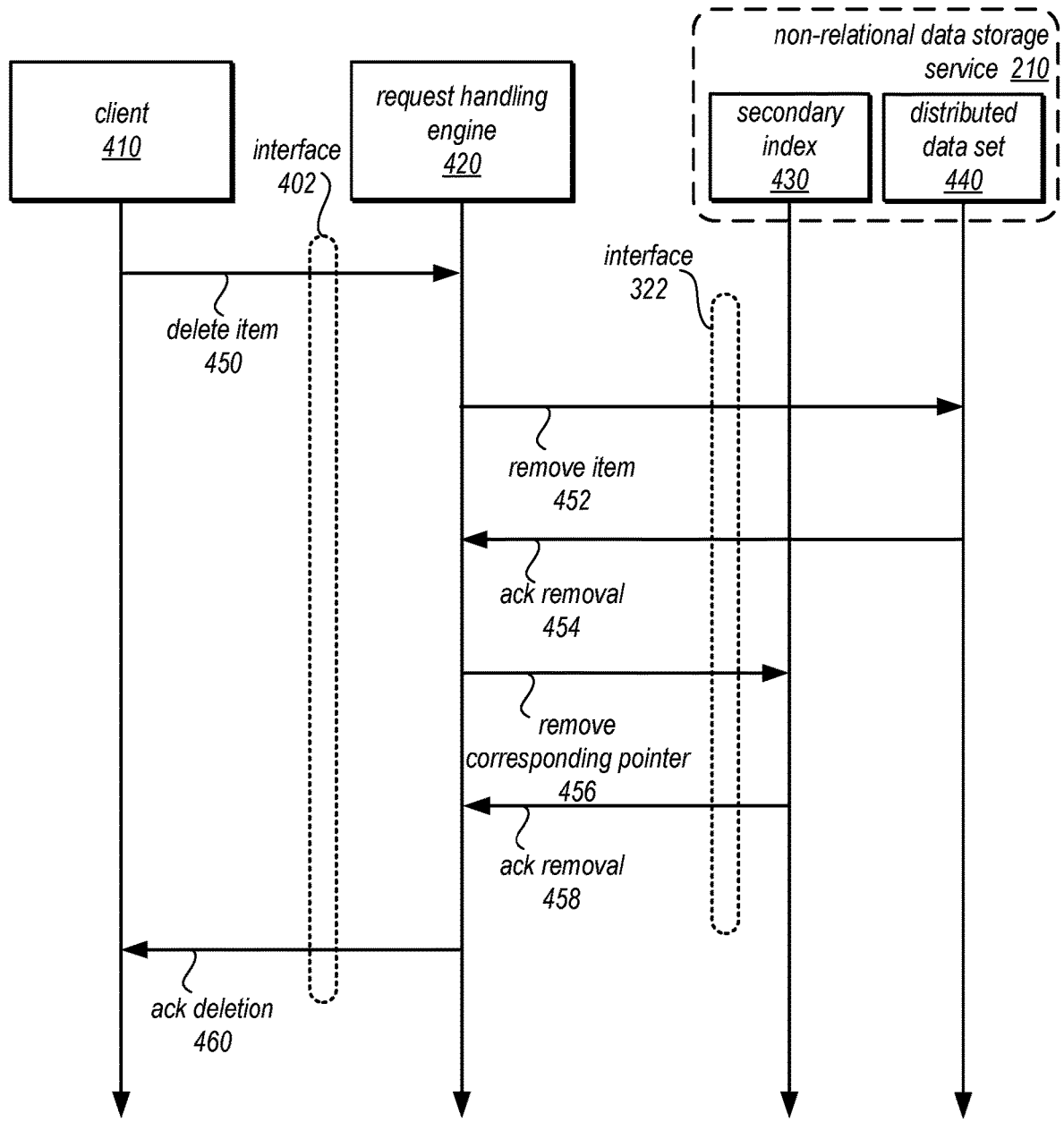
FIG. 4 is an example sequence diagram for deleting items from the distributed data set, according to some embodiments.

FIG. 4 is an example sequence diagram for deleting items from the distributed data set, according to some embodiments. Similar to FIG. 3 above, client 410 may interact with request handling engine 420 via interface 402. Interface 402 may be a programmatic interface, like interface 302 discussed above. Client 410 may submit a request to delete an item or items 450 from distributed data set 440 (e.g., remove an item from a table in distributed data set 440) in non-relational data storage service 210.

In response to receiving the request, request handling engine 420 may send a request to non-relational data storage service 210 to remove the item 452 from distributed data set 440. Non-relational data storage service 210 may perform the deletion request and send an acknowledgment of the removal 454 to request handling client 420. If the removal were unsuccessful, then a failure indication would be returned (not illustrated). Although secondary index 430 now indicates that the deleted item is still in distributed data set 440, a reader of secondary index 430 would be able to discover that the pointer did not point to item in distributed data set 440 if the reader were to read distributed data set 440 before pointer removal request 456, providing a false positive result to a reader. However, this false positive may be discovered by the reader when attempting to get the deleted item identified by the pointer, so a consistent view of distributed data set 440 that is current as of the time the read request was received may still be determined.

Once request handling engine 420 receives the acknowledgement of the removal of the item, then request handling engine 420 may send a request to remove the corresponding pointer 456 that points to the deleted item in secondary index 430. Non-relational data storage service 210 may complete the removal request and send an acknowledgement of the removal 458 to request handling engine 420. If the removal failed, then a failure indication may be returned (not illustrated). Request handling engine 420 may acknowledge the deletion 460 to client 410. Note that in some embodiments, acknowledgment of the deletion 460 may be sent in response to the acknowledgment of the removal of the item 454 as the secondary index would only report a false positive for the deleted item. The pointer may be removed at a later time as part of a reclamation technique, discussed below with regard to FIG. 8.

Please note that the insertion or deletion of items into a distributed data set may be performed as part of transaction, in some embodiments. The insertion and/or deletion requests may thus not be performed until flushed to storage as part of executing the transaction. For example, a transaction log or description holding the transaction may be maintained which ensures that the transaction is committed to the distributed data set even if not yet applied to the distributed data set (as queries may also have to read the transaction log/description and apply any un-flushed transactions to query results). The transaction may then be flushed from the transaction log/description by reading and executing the updates in the transaction log/description.

Figure 5:
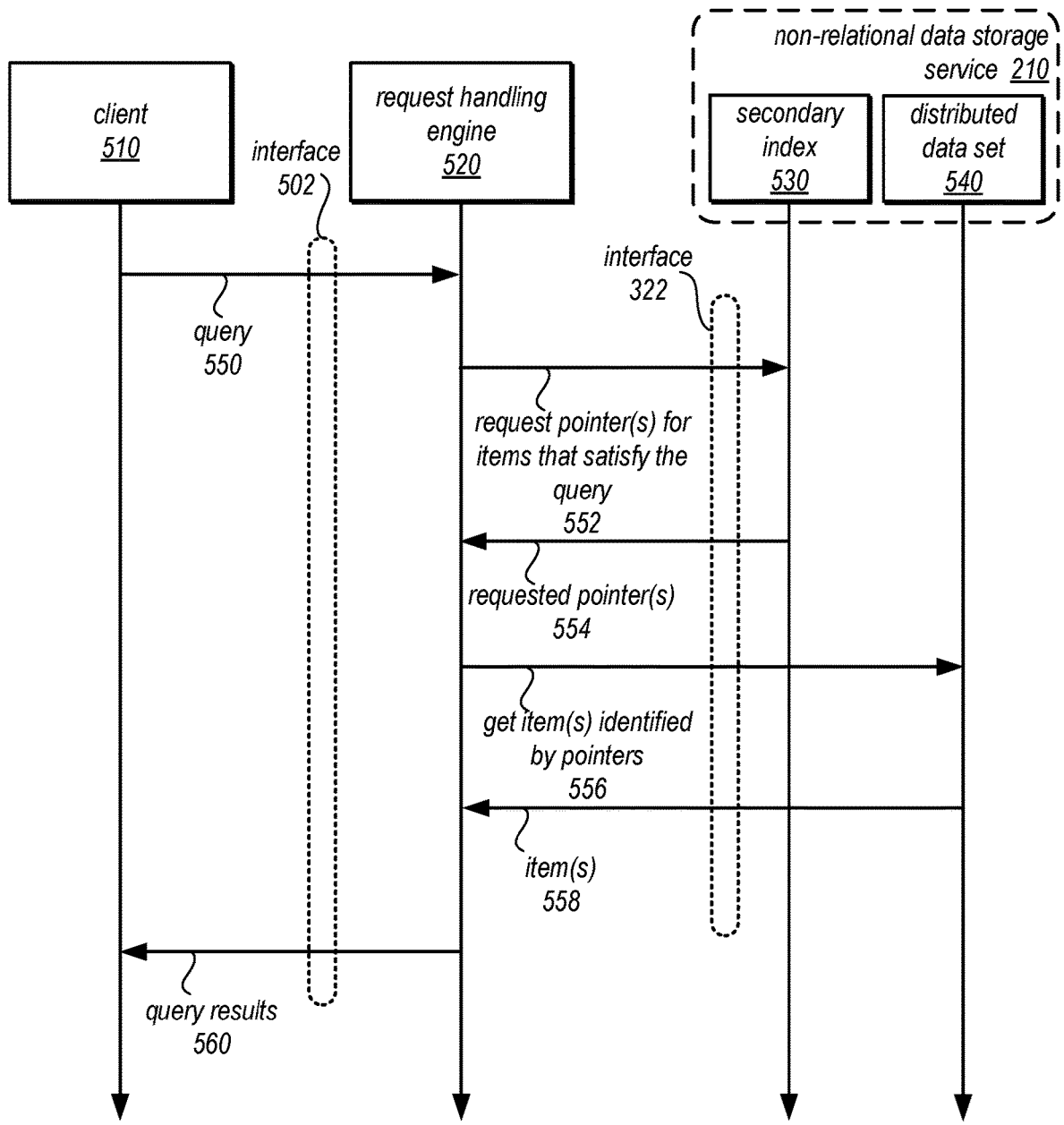
FIG. 5 is an example sequence diagram for querying the distributed data set utilizing the secondary index, according to some embodiments.

FIG. 5 is an example sequence diagram for querying the distributed data set utilizing the secondary index, according to some embodiments. Similar to FIGS. 3 and 4 above, client 510 may interact with request handling engine 520 via interface 502. Interface 502 may be a programmatic interface, like interface 302 and 402 discussed above. Client 510 may submit a query for items in distributed data set 540 that satisfy one or more query predicates. For example, query predicates may identify which items may need to be retrieved (e.g., items with an attribute, such as user name, that matches a certain value), and what desired information may be returned (e.g., the resource name attribute value for each item that includes the matching user name).

Request handling engine 520 may evaluate and/or send a request to non-relational data storage service to obtain the pointers of items 552 that satisfy the query via interface 322 for non-relational data storage service 210. For example, the request may take advantage of the schema of secondary index 530 so that non-relational data storage service 210 may efficiently find and return the pointers of items that satisfy the query (e.g., because the secondary index is organized according to one or more values that are specified as query predicates, such as the user name example given above) without performing a scan of the entire distributed data set 540. Non-relational data storage service 210 may return the requested pointer(s) 554 (or no pointers if none satisfy the query) to request handling engine 520.

Once the pointers are received, request handling engine 520 may then send a request to get the item(s) identified by the pointer(s) 556 to non-relational data storage service 210 from distributed data set 540. For example, multiple commands to retrieve individual items may be sent according to each pointer retrieved, or a batch get command may be sent that includes a listing of the items to retrieve. Item(s) 558 that exist in distributed data set 540 may be sent back to request handling engine 520. For items requested due to a false positive in secondary index 530, an indication that the requested item does not exist may be sent (not illustrated). Request handling engine 520 may send the requested query results 560 to client 510 (excluding non-existent items), in various embodiments.

Figure 6:
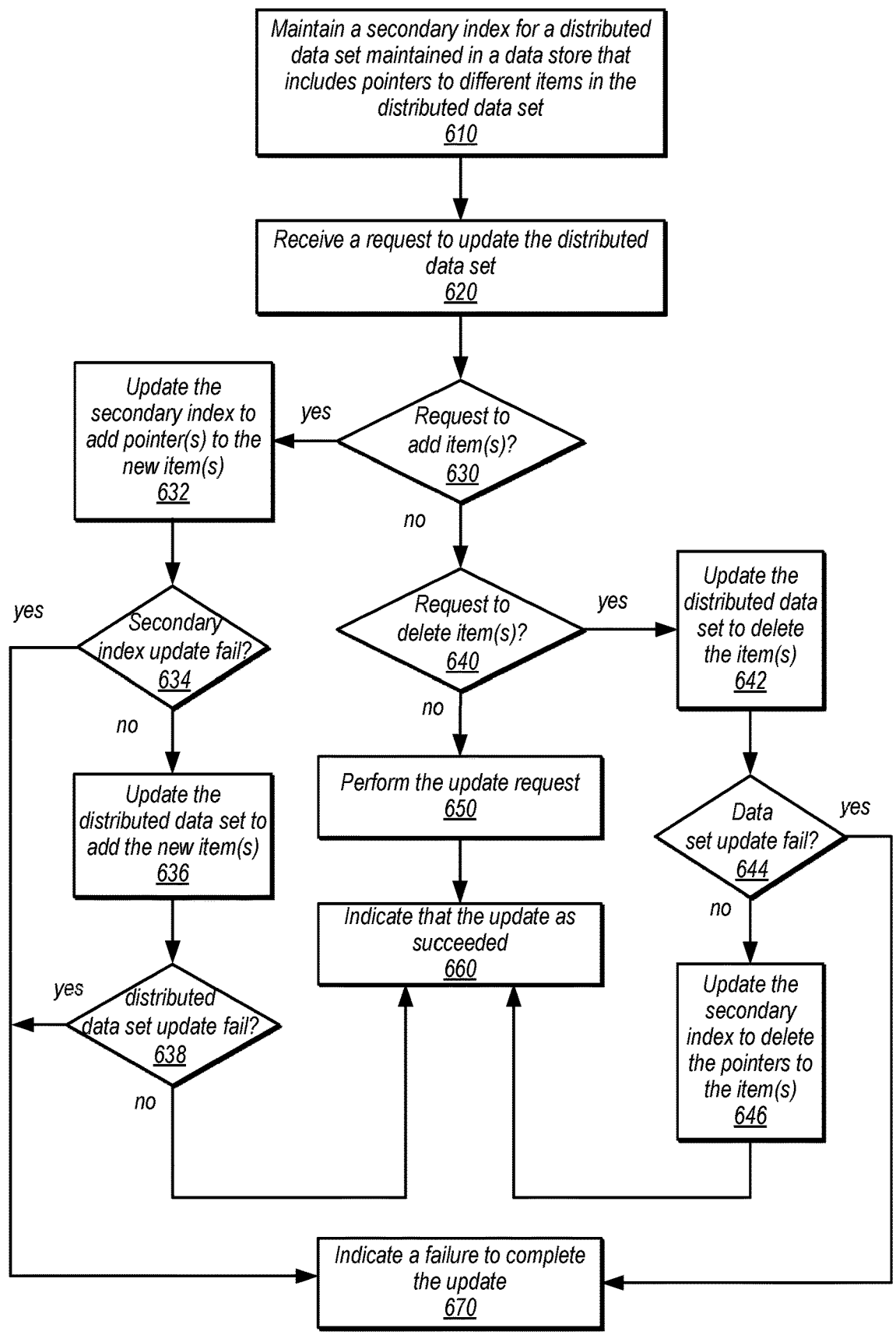
FIG. 6 is a high-level flowchart illustrating various methods and techniques to implement a strongly consistent secondary index for servicing access requests to a distributed data set, according to some embodiments.

The examples of a strongly-consistent secondary index implemented for distributed data sets in FIGS. 2-5 have been given in regard to a non-relational storage service. However, various other types of data stores may be used to implement a strongly-consistent secondary index for a distributed data set, such as a relational database system. FIG. 6 is a high-level flowchart illustrating various methods and techniques to implement a strongly consistent secondary index for servicing access requests to a distributed data set, according to some embodiments. These techniques may be implemented as part of a request handling engine as discussed above, as well as at systems or components separate from a client or storage engine, and thus the following discussion is not intended to be limiting as to the other types or configurations of request handling engines that may implement the described techniques.

As indicated at 610, a secondary index may be maintained for a distributed data set maintained in a data store. The secondary index may include respective pointers to individual items in the data store (e.g., identifiers, paths, locations, or other information that makes the individual items discoverable and retrievable from the data store). In addition to pointers, the secondary index may store additional information, such as information used by a storage schema to arrange the secondary index. For example, if the secondary index is sorted according to one or more attribute values in addition to attributes that include the pointers to the respective items in the distributed data set, then the secondary index may store these attributes as part of items that include the pointers to other items in the distributed data set.

The secondary index may be dynamically maintained by one or multiple clients, systems, or components that interact with the data store. For example, in one instance a client may perform an insertion to a distributed data set and may also update the secondary index. As part of a different operation, the same client may perform a query with respect to the secondary index and distributed data set. Because multiple clients may be accessing the distributed data set at any given time, the secondary index may be maintained as a strongly consistent index so that a current state of the distributed data set at the time the query or other access request is received is described by or discoverable by the contents of the secondary index. Thus while the secondary index may include a false positive indicating that an item is present in the distributed data set when it is not, the false positive may be discoverable and resolved when processing an access request with respect to the distributed data set. A false negative, however, may not be discoverable or resolvable when processing an access request so changes to the secondary index may be made so that false negatives are not possible when reading the secondary index.

For example, as indicated at 620, a request to update the distributed data set may be received. As indicated by the positive exit from 630, the request may be a request to add item(s) to the distributed data set, in some embodiments. The secondary index may be updated to add pointer(s) to the new item(s) in the request, as indicated at 632. If the update to the secondary index failures, as indicated by the positive exit from 634, then an indication that the update request failed may be provided, as indicated at 670. If the secondary index update succeeded, then as indicated at 636, the distributed data set may be updated to add the new item(s). If the distributed data set update failed, then as indicated by the positive exit from 638, an indicated that the update failed to complete may be provided, as indicated at 670. However, the distributed data set update succeeded as well, then the update may be acknowledged as complete.

As indicated at 640, the request may also be a request to delete item(s). If the request is a deletion request, as indicated by the positive exit from 640, then the distributed data set may be updated to delete the requested item(s), as indicated at 642. If the update to the distributed data set fails to delete the item(s) then, as indicated by the positive exit from 644, then an indication that the deletion request failed may be provided, as indicated at 670. If the deletion request succeed, then the secondary index may be updated to delete the pointer(s) that pointed to the deleted item(s), as indicated at 646. Note that the deletion may be indicated as successfully completed, as indicated at 660, whether or not the deletion to the secondary index successfully completes as false positives may be excluded from query results as discussed below with regard to FIG. 8. The secondary index may be evaluated, swept, or cleaned up at a later time.

In some instances, the update request may neither add nor remove items from a distributed data set. For example, a request to change or modify an attribute value, add or remove an attribute value, or any other update that does not affect the contents of the secondary index may be received. Because the secondary index may point to the values of items in the distributed data set, changes to values may not result in a change to the item's presence or absence from the distributed data set. Therefore, as indicated by the negative exit from 640, an update request may be performed, as indicated at 650 without updating the secondary index and acknowledged as performed, as indicated at 660.

Figure 7:
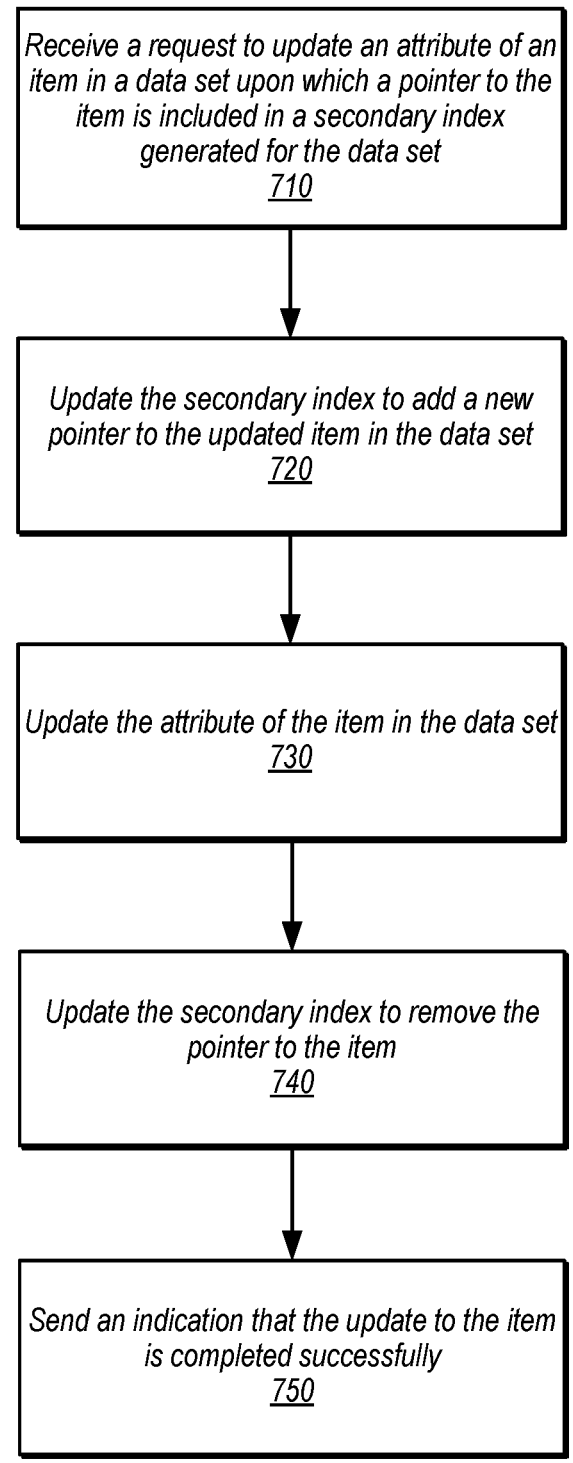
FIG. 7 is a high-level flowchart illustrating various methods and techniques to update a strongly consistent secondary index for servicing a request to update an attribute of an item upon which the secondary index is generated, according to some embodiments.

In some embodiments, the attribute value(s) of items upon which a secondary index is generated may be immutable so that once the item is created, the attribute value(s) cannot be changed. However, in some scenarios, it may be desirable to update attribute values which may result in change to the location or inclusion of the item within the secondary index. FIG. 7 is a high-level flowchart illustrating various methods and techniques to update a strongly consistent secondary index for servicing a request to update an attribute of an item upon which the secondary index is generated, according to some embodiments.

As indicated at 710, a request to update an attribute of item in a distributed data set upon which a secondary index is generated may be received. For example, if the secondary index orders items in the secondary index based on an age attribute value (e.g., from youngest to oldest), then a request to update the age attribute of an item would modify the attribute of the item upon which the secondary index is generated. As indicated at 720, in response to receiving the update to the attribute of the item, an update to the secondary index may be performed to add a new pointer to the secondary index to the item that is based on the modification to the attribute of the item by the update. Continuing with the above example, a new pointer may be added to the secondary index with the different age value (e.g., in a different location in the ordering of items in the secondary index). While two pointers may exist to the same item at this time, a client reading the secondary index and getting two pointers would discover that one of the pointers was incorrect when reading the item in the distributed data set (e.g., that the age value was not what the new pointer claimed it to be).

As indicated at 730, an update may then be performed to the attribute value of the item according to the update request (e.g., the age value of the attribute in the item is changed). Again, while two pointers may exist to the same item at this time, a client reading the secondary index and getting two pointers would discover that one of the pointers was incorrect when reading the item in the distributed data set (e.g., that the age value was not what the original pointer claimed it to be). Once the attribute value of the item is updated, then the secondary index may be updated to remove the original pointer to the item that has an incorrect value for the attribute of the item, as indicated at 740. Successful completion of the update may then be indicated, as indicated at 750. For example, an acknowledgement may be sent to a client that requested the update.

Figure 8:
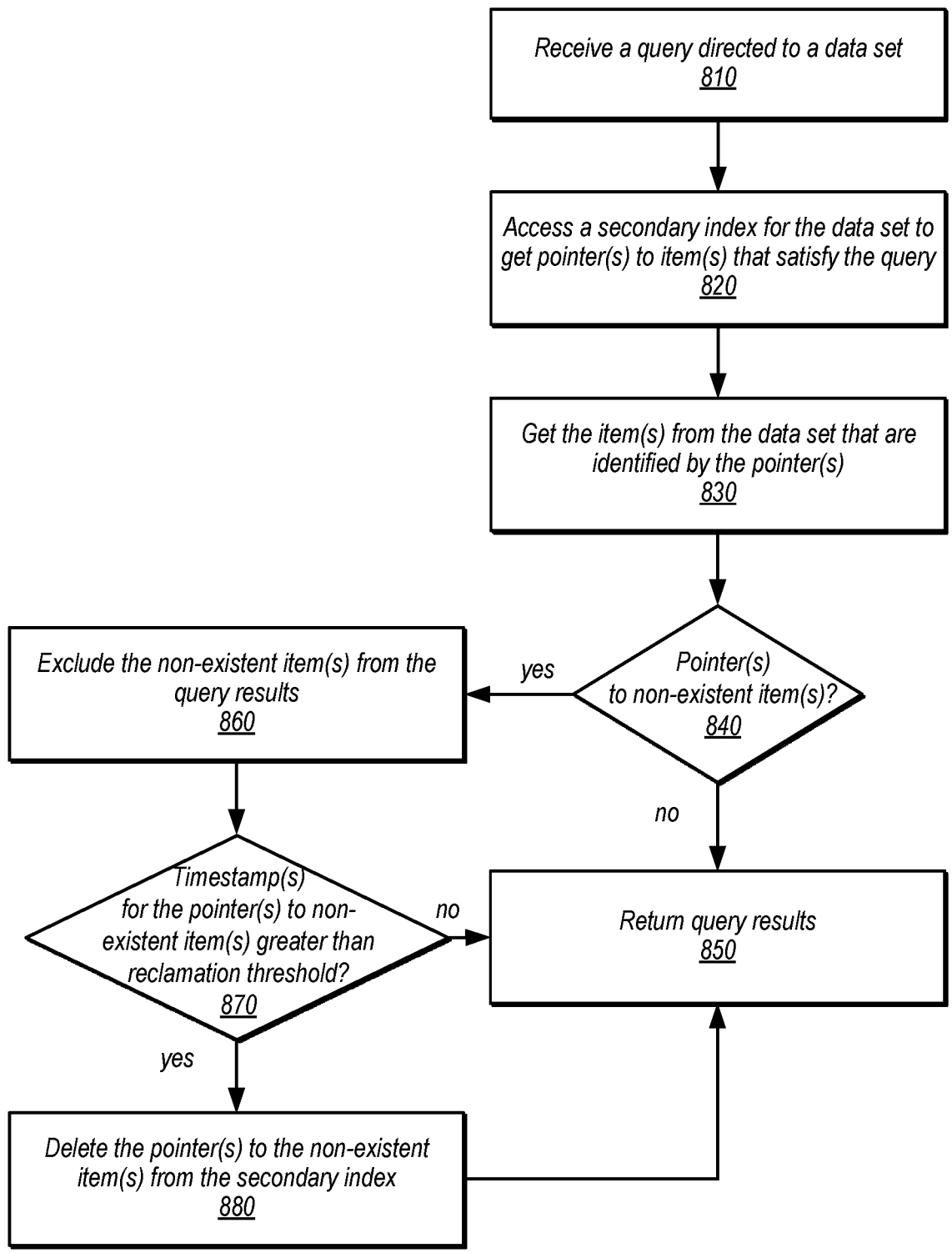
FIG. 8 is a high-level flowchart illustrating various methods and techniques to process queries directed to a distributed data set for which a strongly consistent secondary index is maintained, according to some embodiments.

FIG. 8 is a high-level flowchart illustrating various methods and techniques to process queries directed to a distributed data set for which a strongly consistent secondary index is maintained, according to some embodiments. As indicated at 810, a query may be received that is directed to a distributed data set. The query may be formatted or specified according to a programmatic interface (e.g., either for request handling engine or for the non-transactional data store maintaining the hierarchy). Query predicates included in the query may identify which items may need to be evaluated with respect to the query predicates and what desired information may be returned.

As indicated at 820, the secondary index may be accessed and or evaluated to get pointer(s) to item(s) that satisfy the query. For instance, if the query wants to retrieve all items with a date attribute value within a range of date values, then a query to the secondary index may be sent which specifies the date value range. As the secondary index may be organized so that a query like a query for items within a date value range are optimized, the secondary index may be quickly evaluated to return the pointer(s) of the item(s) that are within the date value range. As indicated at 830, the items identified by the obtained pointer(s) may be obtained. For instance one or multiple requests to get the items may be sent to the data store.

In some instances, the secondary index may report a false positive by providing a pointer to an item that does not exist in the distributed data set. These non-existent items may be identified by error response or indications that the requested item identified by a pointer does not exist in the distributed data set. As indicated by the positive exit from 840, if such a non-existent item is identified, then the non-existent item may be excluded from the query results 860 that are generated and returned at 850. Non-existent items may be either be items that have not yet been added to the distributed data set (e.g., because the insertion request for the item is not yet complete or failed) or may be items that were deleted for which the deletion request of the pointer has not yet been performed or failed. In some embodiments, a reclamation technique may be implemented to remove invalid pointers when found. For example, as indicated at 870, if a timestamp value for the invalid pointer(s) exceeds some reclamation time threshold, then the invalid pointer(s) may be deleted from the secondary index, as indicated at 880. The reclamation time threshold may be set long enough so that false negatives are not created by deleting the pointer because the non-existent item has not yet (but will be) created in the distributed data set. For example, a 1 minute reclamation threshold may be more than sufficient time for an insertion request to succeed or fail to write to the distributed data set.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 9:
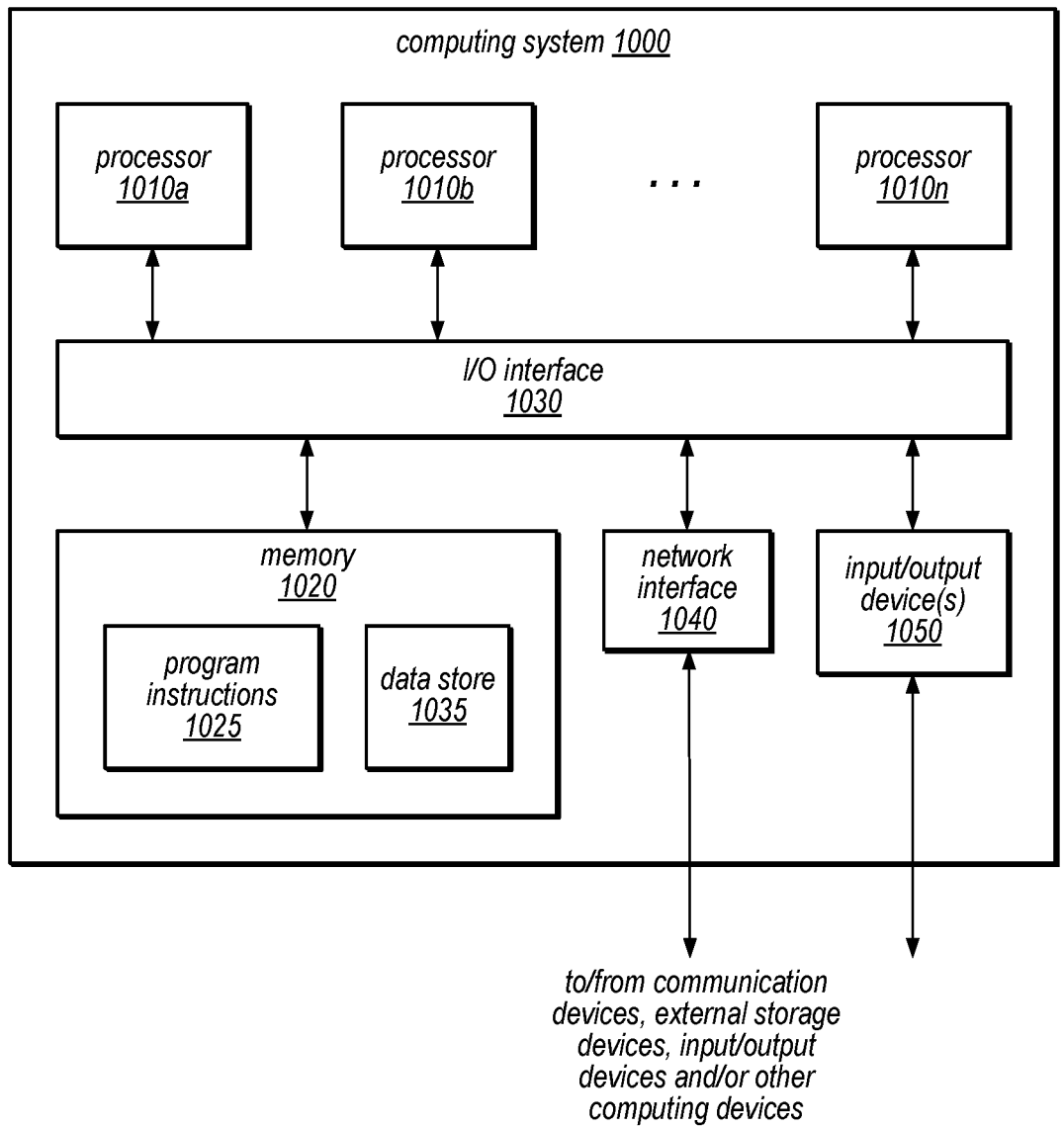
FIG. 9 is a block diagram illustrating an example computing system, according to some embodiments.

Embodiments of a strongly consistent secondary index for a distributed data set as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s).

System memory 1020 may be configured to store program instructions 1025 and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, configured to implement the various embodiments of the systems as described herein, and data store 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor cause the at least one processor to implement a request handling engine on behalf of a client of a data store, wherein the data store maintains a distributed data set comprising a plurality of different items indexed according to first key value of the different items and a secondary index for the distributed data set indexed according to an indexing scheme that identifies a second key value of the different items, wherein the secondary index comprises a plurality of pointers that point to different ones of the different items;
   the request handling engine, configured to:
      receive a request to insert one or more new items into the distributed data set from the client;
      send a request to the data store to add respective pointers that point to the new items in the secondary index according to an indexing scheme for the secondary index that identifies the second key value of the one or more new items;
      receive a response indicating that the respective pointers are successfully added to the secondary index;
      responsive to the receipt of the response indicating that the respective pointers are successfully added to the secondary index, send a request to the data store to add the one or more new items into the distributed data set;
      receive a response indicating that the new items are inserted into the distributed data set; and
      send an acknowledgement of the request to insert the new items to the client.

2. The system of claim 1, wherein the request handling engine is further configured to:
   receive a request from the client to delete another one or more new items from the distributed data set;
   send a request to the data store to remove the other one or more new items from the distributed data set;
   send a request to the data store to remove respective pointers that point to the other one or more items in the secondary index;
   receive a response indicating that the other one or more items are removed from the distributed data set; and
   send an acknowledgement of the request to delete the other one or more items to the client.

3. The system of claim 1, wherein the request handling engine is further configured to:
   receive a query directed to the distributed data set from the client or a different client of the data store;
   send a request to the data store to obtain one or more of the pointers in the secondary index that point to one or more of the items in the distributed data set that satisfy the query;
   send a request to the data store to obtain the one or more items identified by the obtained one or more pointers; and
   return query results to the client or the different client based, at least in part, on the obtained one or more items.

4. The system of claim 1, wherein the data store is a network-based database service, wherein the request to add the one or more pointers and the request to add the one or more new items are formatted according to a network-based interface for the database service, wherein the request handling engine is a library maintained at the client, and wherein the request to insert the one or more new items and the acknowledgement of the request to insert the one or more new items formatted according to a programmatic interface implemented as part of the library.

5. A method, comprising:
performing, by one or more computing devices implementing request handling engine on behalf of a client of a data store:
receiving a request to add a new item to a distributed data set maintained in the data store;
updating a secondary index in the data store to add a pointer to the new item in the distributed data set according to an indexing scheme for the secondary index, wherein the secondary index comprises respective pointers to different items in the distributed data set that are indexed according to a key value identified by the indexing scheme that is different than a primary key value used to index the different items in the distributed data set;
after updating the secondary index succeeds, adding the new item to the distributed data set according to the request such that the new item is not accessible in the distributed data set until the pointer identifying the new item is included in the secondary index for servicing a request from one or more clients of the data store to access the distributed data set.

6. The method of claim 5, further comprising:
receiving a request to add another new item to the distributed data set;
detecting a failure to:
update the secondary index to add a pointer to the other new item in the distributed data set; or
add the other new item to the distributed data set; and
indicating that the request to add the other new item failed.

7. The method of claim 5, further comprising:
receiving a request to delete one or more of the items in the distributed data set;
removing the one or more items from the distributed data set in the data store according to the request to delete the one or more items; and
updating the secondary index to remove the respective pointers that point to the one or more items in the distributed data set.

8. The method of claim 5, further comprising:
receiving a query directed to the distributed data set;
accessing the secondary index to retrieve one or more of the pointers in the secondary index that point to one or more of the items in the distributed data set that satisfy the query;
obtaining the one or more items identified by the retrieved one or more pointers; and
returning query results based, at least in part, on the obtained one or more items.

9. The method of claim 8,
wherein accessing the secondary index retrieves one or more additional pointers that satisfy the query; and
wherein the method further comprises:
determining that the one or more additional pointers point to one or more non-existent items in the distributed data set; and
excluding the one or more non-existent items identified by the one or more additional pointers from the query results.

10. The method of claim 9, further comprising:
determining that respective timestamps for the one or more additional pointers exceed a reclamation threshold; and deleting the one or more additional pointers from the secondary index.

11. The method of claim 8, wherein the query is received prior to adding the new item to the distributed data set, and wherein the one or more additional pointers include the pointer added to the secondary index that points to the new item.

12. The method of claim 5, further comprising:
receiving a request to update an attribute of an item upon which the secondary index for the distributed data set is generated;
updating the secondary index to add a new pointer to the item based on the update to the attribute of the item;
updating the attribute of the item in the distributed data set according to the request;
updating the secondary index to a remove the respective pointer to the item; and
sending an indication that the update successfully completed.

13. The method of claim 5, wherein the data store is a network-based service, and wherein updating the secondary index and adding the one or more new items to the distributed data set are performed by generating respective requests formatted according to a network-based interface for the network-based service and sending the respective requests to the network-based service.

14. A non-transitory, computer-readable storage medium, storing program instructions that when executed by one or more computing devices that implement a client of a data store cause the one or more computing devices to implement:
receiving a request to add a new item to a distributed data set maintained in the data store;
updating a secondary index in the data store to add a pointer to the new item in the distributed data set according to an indexing scheme for the secondary index, wherein the secondary index comprises respective pointers to different items in the distributed data set that are indexed according to a key value identified by the indexing scheme that is different than a primary key value used to index the different items in the distributed data set;
after updating the secondary index succeeds, adding the new item to the distributed data set according to the request; and
returning an acknowledgement of the request to add the new item to the distributed data set.

15. The non-transitory, computer-readable storage medium of claim 14, wherein the program instructions cause the one or more computing devices to further implement:
receiving a request to add another new item to the distributed data set;
receiving a failure from the data store upon attempt to:
update the secondary index to add a pointer to the other new item in the distributed data set; or
add the other new item to the distributed data set; and
returning a failure indication for the request to add the other new item failed.

16. The non-transitory, computer-readable storage medium of claim 14, wherein the program instructions cause the one or more computing devices to further implement:
receiving a request to delete one or more of the items in the distributed data set from the client or a different client of the data store;
sending a request removing the one or more items from the distributed data set in the data store according to the request to delete the one or more items;

updating the secondary index to remove the respective pointers that point to the one or more items in the distributed data set;

determining that the one or more items are removed from the distributed data set; and returning an acknowledgment of the request to delete the one or more items to the client or the different client.

17. The non-transitory, computer-readable storage medium of claim 16, wherein the request to delete the one or more items in the distributed data set is received as part of a transaction submitted to the data store and wherein the sending of the request to remove the one or more items from the distributed data set is performed upon flushing the transaction from a transaction log.

18. The non-transitory, computer-readable storage medium of claim 14, wherein the program instructions cause the one or more computing devices to further implement:

receiving a request to delete one or more of the items in the distributed data set;

detecting a failure to remove the one or more items from the distributed data set in the data store; and indicating that the request to delete the one or more items in the distributed data set failed.

19. The non-transitory, computer-readable storage medium of claim 14, wherein the program instructions cause the one or more computing devices to further implement:

receiving a query directed to the distributed data set from the client or a different client of the data store;

sending a request to the data store to obtain one or more of the pointers in the secondary index that point to one or more of the items in the distributed data set that satisfy the query;

sending a request to obtain the one or more items identified by the obtained one or more pointers; and returning query results to the client or the different client based, at least in part, on the obtained one or more items.

20. The non-transitory, computer-readable storage medium of claim 14, wherein the program instructions are a library maintained at the client, wherein the received request and the acknowledgment that the one or more new items are inserted are formatted according to a programmatic interface implemented as part of the library, and wherein updating the secondary index and adding the one or more new items are requests that are generated according to an interface for the data store and sent to the data store.

* * * * *